Feb. 10, 1925. 1,525,625
A. C. TAYLOR
METHOD OF ELECTRIC WELDING
Filed Nov. 28, 1921
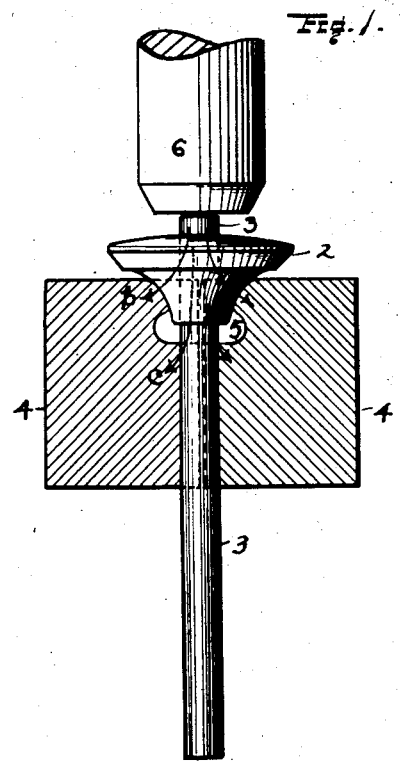
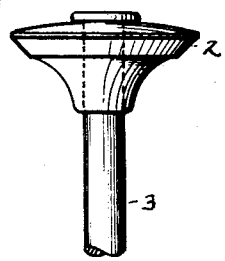
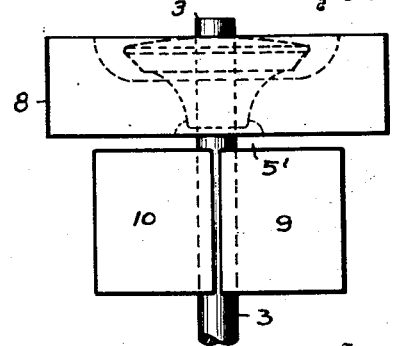
Inventor
ALBERTIS C. TAYLOR.
By Fisher, Moser + Moore
Attorneys Patented Feb. 10, 1925.

1,525,625

UNITED STATES PATENT OFFICE.

ALBERTIS C. TAYLOR, OF WARREN, OHIO.

METHOD OF ELECTRIC WELDING.

Application filed November 28, 1921. Serial No. 518,204.

*To all whom it may concern:*

Be it known that I, ALBERTIS C. TAYLOR, a citizen of the United States, residing at Warren, in the county of Trumbull and State of Ohio, have invented certain new and useful Improvements in a Method of Electric Welding, of which the following is a specification.

The present method is of especial utility in uniting metal valve heads to metal stems to provide a substantially solid and integral valve for use in an internal combustion engine, the general object being to produce welds of great area and strength between the parts and to cheapen the cost of construction of such valves.

Fig. 1 is a side view and section of a valve head and stem sleeved together and held and engaged by dies and electrodes and as appears before applying the current and pressure. Fig. 2 is a side elevation of a valve head with its stem partially upset. Fig. 3 is a side view of an electrode made in several parts and with which my improved method may be practiced.

In manufacturing valves constructed of separate heads and stems it has heretofore been a common practice to form screw threads in the two parts and to screw the head upon the stem before placing them in a welding machine embodying a die. In applying pressure through the upper electrode the current travels through the upper end of the stem and the head to the die or holder. With this old method it is necessary to have the die fit the fillet of the head to a depth of at least ⅜ to ½ of an inch, according to the size of the valve, in order to secure contact of sufficient area to carry the current necessary to make the weld; otherwise if the area of this contact was too small the metal would melt at this point and destroy the head. Screw threading is resorted to for two reasons, (1st.) the stem being steel and of higher melting point and harder to heat; the thin portion of the steel threads extending into the cast iron are brought to a welding temperature more readily by absorbing heat from the cast iron which heats more rapidly than the steel because it is a poorer conductor of electricity, and secondly the screw threads serve to hold the head in firm contact with the lower die when starting to make the weld. The stem extends ⅛ inch or more beyond the head to provide metal for upsetting and filling any loose spaces in the threads that may exist, and to make a perfect weld, the parts or particles of molten metal must be forced together. In practice the screw-threads serve an advantage in the two instances above mentioned, but their presence is a disadvantage in the upsetting operation, and they also weaken the stem. Another objection to this method is that the weld takes place in the upper part of the head and does not weld much more than one-half way through, generally leaving the unwelded portion of the head loose on the stem.

In another method known to me and used to some extent, the valve is knurled or screw-threaded and then pressed into a head having a plain drilled hole, the object being to form projections on the steel stem to increase the resistance of the steel and to promote heating of the stem, and also provide a place for the molten metal to flow and strengthen the weld. In this case an insulated stop is used at the lower end of the stem to prevent the stem from being pushed out of the head when upsetting the stem and completing the weld, the current traveling through the head. The objections to this method are practically the same as the first mentioned method, although the stem is more readily upset. However, the stem does not upset the full thickness of the head as it only heats a little over half way through. Without the knurls or screw-threads the stems do not become hot enough welding only at the extreme top edges, the cast iron flowing around the stem but not adhering to it.

With my improved method I am able to overcome all of the objectional features of the previously described methods, and also reduce the cost of manufacture. Thus, in practicing my method I first drill a plain round hole in the alloy or cast iron head 2 and use a plain stem 3 which snugly fits the hole and projects beyond the upper face of the head substantially as shown in Fig. 1, which is a view showing a cross-section of a divided electrode 4 to permit clamping of stem 3 firmly with good electrical contact over a substantial distance of its length and with ample clamping effect to prevent the stem from pushing out of the head when starting to make the weld. The curved arrows b, c, indicate the divided path of the current, one part travelling through the cast iron and stem, and the other part passing directly through the steel stem from one electrode to the other. I also provide an annular recess 5 in the meeting faces of clamping electrode 4 to promote the separation of the electric current into two paths and to effect heating of the stem to a welding temperature at the extreme lower edge of the head. Recess 5 may be made narrower or wider according to the size of the stem and head being welded, and without this space or recess 5 the stem would not get hot enough at the extreme lower edge of the head to make a weld as the electrode would absorb the heat from the stem at this point.

In making the weld the stem is placed in the head with the end extending a distance of about one-half the diameter of the stem; the assembled parts are then placed in the clamping electrode 4 of the welding machine and the stem clamped firmly in place. The upper electrode 6 is then brought into contact with the upper end of stem 3 under considerable pressure, and a large volume of current of low pressure is then passed through the stem which heats instantly, inasmuch as the head 2 is not in contact with the electrode 4 at this time, thus allowing the pressure of the upper electrode to upset the stem the full length or depth of the head and at the same time forming a flattened head on the stem as shown in Fig. 2. In this proceeding valve head 2 is pressed firmly against the contact surface 7 of electrode 4, and valve head 2 also has a perfect electrical contact with the stem at all points, the current now traveling in both paths as indicated by arrows b, c, until the desired welding temperature has been reached. During the heating operation the pressure of the upper electrode is steadily increased to force the molten monocules of metal together and also prevent gas pockets from forming in the cast-iron head.

In practicing my method, I prefer to use plain stems, but if this method is practiced with threaded or knurled stems I will get practically the same results, excepting that gas pockets might be more apt to form in the cast-iron surrounding the stem.

In Fig. 3, I show a modification, consisting of a lower electrode made in several separate parts, the head contact being a solid block 8 with a hole made to fit the shape of the lower portion of the head, and the stem contact and gripping members 9 and 10 being divisional parts meeting on the center line of stem and spaced apart from the head seating block 8. In use the block or electrode 8 and members 9 and 10 are all connected to the same terminal of the transformer or source of current, the space 5' being equivalent to space 5 in Fig. 1.

Summarizing the advantages of my method, in using a plain stem I save the expense of screw-threading; the stem at the weld is increased in size and not weakened as compared with a screw-threaded stem; I also save the expense of screw-threading or tapping the heads; the weld extends the entire length or depth of the head without the use of any more current as compared with former practices; and in case any part is not completely welded the upsetting of the stem insures a perfect fit at all points.

What I claim, is—

1. A method of electrically welding a valve head and stem together, consisting in sleeving the stem within the head and electrically heating and thickening and shortening the valve stem the engaging portion of the stem with the full length of the head and then welding the complete upset and engaging portions of said stem to said head.

2. A method of uniting a valve head and stem together, consisting in sleeving the stem within the head and slightly beyond the upper face thereof, in placing the assembled parts between welding electrodes and passing the main volume of an electric welding current from one electrode to the other first through the stem and then through both the head and stem until the desired welding temperature has been reached.

3. The method described of uniting valve heads to stems by subjecting the parts to be welded to heavy pressure and at the same time passing the main volume of a welding current in one path through the stem, and then dividing said current by passing it through both the stem and head until the desired welding temperature has been reached.

4. A method of electrically welding a cast-iron valve head and a steel stem together, consisting in passing an electric welding current initially through the stem, and then through the head and stem on divided paths, and in applying pressure to upset the stem and weld the head thereto.

5. Means for welding a separate valve head to a stem, comprising a divided welding electrode for holding the stem and head, said stem contact faces being separated a predetermined distance from the head contact faces to promote heating of the stem.

6. Means for welding a separate valve head to a stem, comprising a divided electrode having a contact face for engaging the lower side of a valve head and gripping contact faces for conducting current and holding the stem in upsetting operations.

7. Means for welding a separate cast iron valve head upon a steel stem, comprising an electric welding electrode, having a seating portion for the valve head and clamping portions for the stem spaced apart from said seating portion.

In testimony whereof I affix my signature in presence of two witnesses.

ALBERTIS C. TAYLOR.

Witnesses:
    EDW. M. RAY,
    MARGARET CAMPBELL.